R. L. Allen.
Button.
Nº 26239.   Patented Nov. 29. 1859
Fig. 1ᵃ
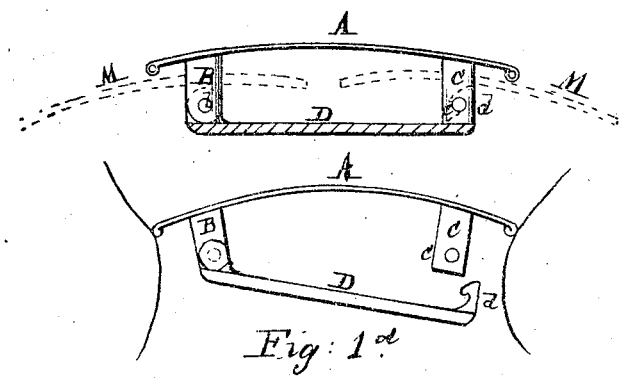
Fig. 1ᵇ
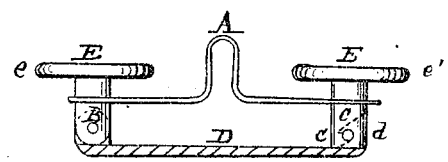
Fig. 1ᶜ
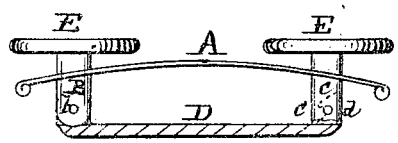
Fig. 2.
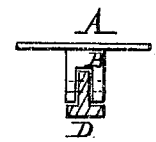
Witnesses
George H. Browne
Inventor
R. L. Allen

UNITED STATES PATENT OFFICE.

REUBEN L. ALLEN, OF PROVIDENCE, RHODE ISLAND.

SLEEVE-FASTENER.

Specification of Letters Patent No. 26,239, dated November 29, 1859.

*To all whom it may concern:*

Be it known that I, REUBEN L. ALLEN, of Providence, in the county of Providence and State of Rhode Island, have invented a certain new and Improved Sleeve-Fastening; and I hereby declare that the following is a full and exact description of the same, reference being had to the accompanying drawings, forming a part of this specification, in which—

Figure $1^a$, $1^b$, $1^c$, are side views, Fig. $1^d$, the same loosed and Fig. 2, an end view.

To enable others skilled in the art to make and use my invention, I will proceed to describe its construction and operation by the aid of the drawings, and by the letters of reference thereon.

A, is a thin metallic spring bent in any of the forms shown in Figs. $1^a$, $1^b$, $1^c$, B and C, are cylindrical arms extending therefrom near the ends.

D, $d$, is a bar hinged to B, at $b$, and adapted to hook over a suitable catch $c$, on the end of C, as represented. The face of the catch $c$, or of the hook $d$, or both are inclined as represented.

M, M, are parts of the sleeve which are fastened by this device.

When a considerable force is applied to the ends of A, forcing them each toward the other the metal yields slightly by its elasticity and the deflection being increased in effect by the length of the arms B, C, releases the hook $d$, from the catch $c$, and the fastening is thereby loosed. When it is to be inserted the bar D, is pressed into contact with $c$, and the leverage due to the length of B, and C, enables $d$, to seize $c$, with but a little expenditure of force and with but little friction or abrasion of the parts. The considerable force required to compress A, and release the fastening, and the little force required to secure it by pressing the parts C, D, together renders the fastening durable and easy to operate while it is but little exposed to be released by any accidental forces.

Buttons or any other ornamental parts of rigid material may, if desired, be mounted in front or as a cover to the spring A, such parts are shown by E, E, in the drawings. When such are employed the spring A, must either be bent as shown in Fig. $1^b$, so that the pressure on the edges $e'$ $e'$ of the buttons shall release the hook $d$, when sufficiently strong or must be so exposed near it that the hand may easily be made to act on it to produce such effect. This last construction is shown in Fig. $1^c$, and is on some accounts preferable to that shown in Fig. $1^b$, especially the non-liability of the hook $d$, to be released by accidental strains on the buttons E.

It will be observed that any tension on the sleeve M, M, cannot affect the fastening in such a manner as to release $d$.

My sleeve fastening possesses qualities not found in any other known to me. It is in but two parts, it is inserted with great facility by passing D through the hole in a part M, without straining or disturbing the stiffening of the sleeve, and when in place the arms B and C, serve as shoulders of buttons except that they are rigid in their places, the strain on them being directly lateral and fair in lieu of oblique.

My fastening abrades, soils, and crumples the sleeve less than any other known to me.

Having now fully described my invention, what I claim as new therein and desire to secure by Letters Patent, is—

The new article of manufacture, herein described, namely, a sleeve fastening composed of the spring A, cylindrical arms B, C, hinge and catch $b$, $c$, and hooked bar D, arranged in the relations and so as to operate together in the manner hereinbefore set forth.

R. L. ALLEN.

Witnesses:
GEORGE H. BROWNE,
W. D. ANSLYCK.